United States Patent
Tomiyama

(10) Patent No.: US 10,333,580 B2
(45) Date of Patent: Jun. 25, 2019

(54) COMMUNICATION APPARATUS AND METHOD FOR CONTROLLING COMMUNICATION APPARATUS

(71) Applicant: SONY CORPORATION, Tokyo (JP)

(72) Inventor: Hitoshi Tomiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/565,016

(22) PCT Filed: Feb. 26, 2016

(86) PCT No.: PCT/JP2016/055754
§ 371 (c)(1),
(2) Date: Oct. 6, 2017

(87) PCT Pub. No.: WO2016/170844
PCT Pub. Date: Oct. 27, 2016

(65) Prior Publication Data
US 2018/0115341 A1 Apr. 26, 2018

Related U.S. Application Data

(63) Continuation of application No. PCT/JP2016/055754, filed on Feb. 26, 2016.

(30) Foreign Application Priority Data

Apr. 21, 2015 (JP) .................... 2015-086417

(51) Int. Cl.
*H04B 1/48* (2006.01)
*H04J 3/02* (2006.01)
(Continued)

(52) U.S. Cl.
CPC ............. *H04B 1/48* (2013.01); *H04B 13/005* (2013.01); *H04J 3/02* (2013.01); *H04L 5/14* (2013.01); *H04Q 9/00* (2013.01)

(58) Field of Classification Search
CPC .......... H04B 1/48; H04B 13/005; H04Q 9/00; H04L 5/14; H04J 3/02
See application file for complete search history.

(56) References Cited

U.S. PATENT DOCUMENTS

2001/0009222 A1* 7/2001 Mizouchi ............. C23C 14/185
204/192.17
2007/0090859 A1* 4/2007 Tokunaga ............. H03F 1/0261
326/83
(Continued)

FOREIGN PATENT DOCUMENTS

CN      101128985 A    2/2008
EP       1838006 A1    9/2007
(Continued)

OTHER PUBLICATIONS

International Search Report and Written Opinion of PCT Application No. PCT/JP2016/055754, dated May 17, 2016, 07 pages of ISRWO.

Primary Examiner — Brian D Nguyen
(74) Attorney, Agent, or Firm — Chip Law Group

(57) ABSTRACT

In a communication device that performs communication by a time division system, it is intended to enhance the communication speed. A communication apparatus includes a transmission unit, a reception unit, a switching unit, and a discharge unit. In the communication apparatus, the transmission unit transmits a transmission signal. Moreover, the reception unit receives a reception signal. Moreover, in the communication apparatus, the switching unit switches a connection destination of one end of a communication path from one of the transmission unit and the reception unit, to the other. Furthermore, the discharge unit lowers, by discharging, a surge voltage generated in the switching unit due to the switching of the connection destination.

15 Claims, 16 Drawing Sheets

(51) Int. Cl.
  *H04B 13/00*    (2006.01)
  *H04L 5/14*     (2006.01)
  *H04Q 9/00*     (2006.01)

(56) References Cited

U.S. PATENT DOCUMENTS

| | | |
|---|---|---|
| 2007/0270105 A1 | 11/2007 | Uejima et al. |
| 2008/0310382 A1* | 12/2008 | Nakagawa ............... H01P 1/15 370/339 |
| 2012/0075004 A1 | 3/2012 | Miyazawa |
| 2012/0100804 A1* | 4/2012 | Miles .................. G06K 7/0008 455/41.1 |
| 2012/0293009 A1* | 11/2012 | Kim .................... H02H 7/1252 307/104 |
| 2013/0072134 A1* | 3/2013 | Goto ..................... H04B 1/109 455/78 |
| 2013/0207712 A1* | 8/2013 | Suzuki ................ H03K 17/165 327/379 |
| 2014/0127998 A1* | 5/2014 | Miles .................. G06K 7/0008 455/41.1 |
| 2014/0354263 A1* | 12/2014 | Brodzeli ............... G01R 29/12 324/96 |

FOREIGN PATENT DOCUMENTS

| | | |
|---|---|---|
| JP | 2012-074890 A | 4/2012 |
| JP | 2013-034093 A | 2/2013 |
| JP | 2013-55404 A | 3/2013 |
| JP | 2013-055404 A | 3/2013 |
| KR | 10-2007-0102560 A | 10/2007 |
| WO | 2007/023731 A1 | 3/2007 |

\* cited by examiner

COMMUNICATION APPARATUS AND METHOD FOR CONTROLLING COMMUNICATION APPARATUS

CROSS REFERENCE TO RELATED APPLICATIONS

This application is a U.S. National Phase of International Patent Application No. PCT/JP2016/055754 filed on Feb. 26, 2016, which claims priority benefit of Japanese Patent Application No. JP 2015-086417 filed in the Japan Patent Office on Apr. 21, 2015. Each of the above-referenced applications is hereby incorporated herein by reference in its entirety.

TECHNICAL FIELD

The present technology relates to a communication apparatus and a method for controlling the communication apparatus. Specifically, the present invention relates to a communication apparatus that performs communication using a time division multiplexing system, and a method for controlling the communication apparatus.

BACKGROUND ART

In recent years, a technique of human body communication that communicates using a human body in a very narrow range around the human body attracts attention. This human body communication network is also referred to as a body area network (BAN). Known communication standards corresponding to the BAN include international organization for standardization (ISO)/international electrotechnical commission (IEC) 17982. This standard enables a plurality of communication devices to communicate using a time division duplex (TDD) system. In the time division multiplexing system, time is divided in units of time slots, and the transmission or reception of the communication device is allocated to the time slot beforehand.

In order to perform the above-described communication using the time division multiplexing system, there is a proposed communication device, for example, including an amplifier that amplifies a transmission signal, an amplifier that amplifies a reception signal, and a switch that switches connection between the amplifier and the communication path (refer to Patent Document 1, for example). The switch in the communication device switches a connection destination of the communication path to a transmission side amplifier immediately before the time slot that corresponds to the transmission, and switches the connection destination to a reception side amplifier immediately before the time slot that corresponds to the reception.

CITATION LIST

Patent Document

Patent Document 1: Japanese Patent Application Laid-Open No. 2012-74890

SUMMARY OF THE INVENTION

Problems to be Solved by the Invention

In the communication device described above, however, a DC offset voltage might be generated in the switch in switching between transmission and reception, and the DC offset voltage might lead to a communication error. The DC offset voltage is a voltage caused by a phenomenon (charge injection) of releasing, at the time of switch-off, the charge accumulated in a capacitive component of a transistor constituting the switch and is also referred to as a surge voltage. Even though this surge voltage is lowered by self-discharge of the capacitive component, there is a need to provide an interval between transmission and reception until the surge voltage is sufficiently lowered by the self-discharge. Accordingly, it is difficult to enhance the communication speed in above-described communication device.

The present technology has been developed in view of such a situation, and is intended to enhance the communication speed in a communication device performing communication in a time division system.

Solutions to Problems

The present technology is intended to resolve the above-described problem and a first aspect of the present technology is a communication apparatus including a transmission unit that transmits a transmission signal, a reception unit that receives a reception signal, a switching unit that switches a connection destination at one end of a communication path from one of the transmission unit and the reception unit, to the other, and a discharge unit that lowers, by discharging, a surge voltage generated due to switching of the connection destination at the switching unit, and a method for controlling the communication apparatus. This configuration achieves an effect of lowering, by the discharging, the surge voltage generated in the switching unit due to switching of the connection destination.

Moreover, in the first aspect, the reception unit may receive and amplify the reception signal, and the discharge unit may lower the surge voltage at the time of switching from the transmission unit to the reception unit. This configuration achieves an effect of lowering the surge voltage at the time of switching from the transmission unit to the reception unit.

Moreover, in the first aspect, the discharge unit may be formed with a discharge transistor that is a transistor for lowering the surge voltage by the discharging. This configuration achieves an effect of performing discharge by the discharge transistor.

Moreover, in the first aspect, the discharge transistor may be an N-type transistor. This configuration achieves an effect of performing discharge by the N-type transistor.

Moreover, in the first aspect, the discharge transistor may be a P-type transistor. This configuration achieves an effect of performing discharge by the P-type transistor.

Moreover, in the first aspect, the switching unit may include a transmission transistor that is a transistor for opening and closing a path between one end of the communication path and the transmission unit, and may include a reception transistor, that is, a transistor for opening and closing a path between the one end of the communication path and the reception unit. This configuration achieves an effect of opening and closing the path between one end of the communication path and the reception unit, and the path between the one end of the communication path and the transmission unit.

Moreover, in the first aspect, a gate width of the discharge transistor may be smaller than the gate width of both of the transmission transistor and the reception transistor. This configuration achieves an effect of performing discharge by the discharge transistor having a gate width smaller than the gate width of any of the transmission transistor and the reception transistor.

Moreover, in the first aspect, it is allowable to further include a control circuit that controls the discharge transistor, the transmission transistor, and the reception transistor to be transitioned to any of a conductive state and a non-conductive state. This configuration achieves an effect of performing switching of the connection destination and a discharge by controlling the discharge transistor, the transmission transistor, and the reception transistor.

Moreover, in the first aspect, the control circuit may control the transmission transistor and the reception transistor to be transitioned to the non-conductive states before the reception unit receives the reception signal, control the discharge transistor to be transitioned to the conductive state, and control the reception transistor to be transitioned to the conductive state when the reception unit receives the reception signal and may transition the discharge transistor to the non-conductive state. This configuration achieves an effect of causing the transmission transistor and the reception transistor to be transitioned to the non-conductive state, and thereafter causing the discharge transistor to be transitioned to the conductive state, and causing the reception transistor to be transitioned to the conductive state.

Moreover, in the first aspect, each of the transmission signal and the reception signal may be a differential signal including a positive side signal and a negative side signal, and the discharge unit may include a positive side discharge switch to open or close a path between a positive side signal line to transmit the above-described positive side signal and a terminal with a predetermined potential, and may include a negative side discharge switch to open or close a path between a negative side signal line to transmit the above-described negative side signal and a terminal with the predetermined potential. This configuration achieves an effect of opening and closing the path between the positive side signal line and the terminal, and between the negative side signal line and the terminal.

Moreover, in the first aspect, each of the transmission signal and the reception signal may be a differential signal including a positive side signal and a negative side signal, and the discharge unit may include a short circuit switch for opening and closing a path between the positive side line that transmits the positive side signal and the negative side signal line that transmits the negative side signal. This configuration achieves an effect of opening and closing the path between the positive side signal line and the negative side signal line.

Moreover, in the first aspect, ends of the short circuit switch may be connected to the positive side signal line and the negative side signal line arranged between the switching unit and the reception unit. This configuration achieves an effect of opening and closing the path between the positive side signal line and the negative side signal line arranged between the switching unit and the reception unit.

Moreover, in the first aspect, ends of the short circuit switch may be connected to the positive side signal line and the negative side signal line arranged between the switching unit and one end of the communication path. This configuration achieves an effect of opening and closing the path between the positive side signal line and the negative side signal line arranged between the switching unit and one end of the communication path.

Moreover, in the first aspect, ends of the above-described short circuit switch may be connected to the positive side signal line and the negative side signal line arranged between the switching unit and the transmission unit. This configuration achieves an effect of opening and closing the path between the positive side signal line and the negative side signal line arranged between the switching unit and the transmission unit.

Moreover, in the first aspect, one end of the communication path may be a pair of electrodes, and the transmission signal and the reception signal may be transmitted via an electric field generated by a voltage between the pair of electrodes. This configuration achieves an effect of transmitting the transmission signal and the reception signal via the electric field generated by the voltage between the pair of electrodes.

EFFECTS OF THE INVENTION

According to the present technology, it is possible to achieve an excellent effect of enhancing the communication speed in a communication device that performs communication in a time division system. Note that effects described herein are non-limiting. The effects may be any effects described in the present disclosure.

MODE FOR CARRYING OUT THE INVENTION

Figure 1:
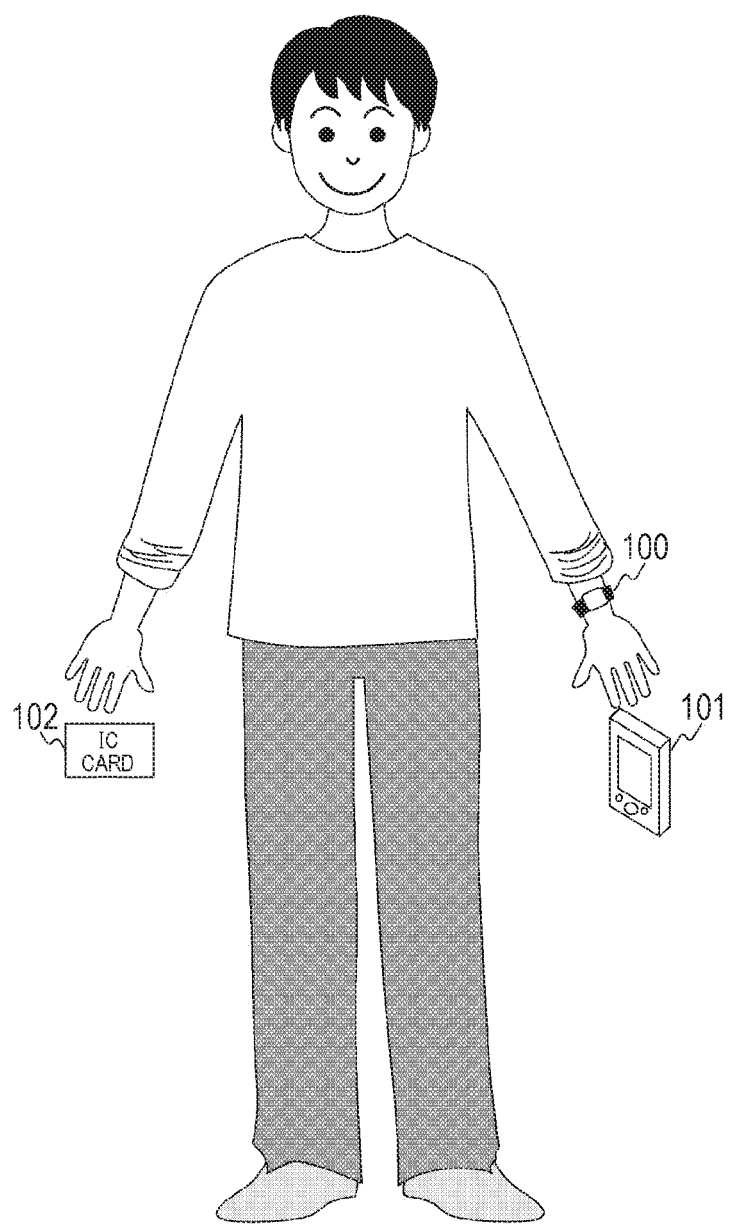
FIG. 1 is an overall view illustrating an exemplary communication system according to an embodiment.

Hereinafter, embodiments of the present invention (hereinafter, embodiment(s)) will be described. The description will be given in the following order.
1. First embodiment (example of performing discharge at transmission/reception switching)
2. First modification example
3. Second modification example
<1. Embodiment>
[Exemplary Configuration of Communication System]
FIG. 1 is an overall view illustrating an exemplary communication system according to an embodiment. The communication system includes a plurality of communication devices such as communication devices 100, 101 and 102. These communication devices communicate by a TDD system via BAN. As these communication devices, a wearable type, a spectacle type wearable terminal, an implant device, an IC (Integrated Circuit) card, a card reader/writer, a mobile phone, and the like are assumed. Moreover, in the TDD system, time is divided in units of time slots of a fixed length, and a transmission period or a reception period of a communication device is allocated in advance to each time slot.

Figure 2:
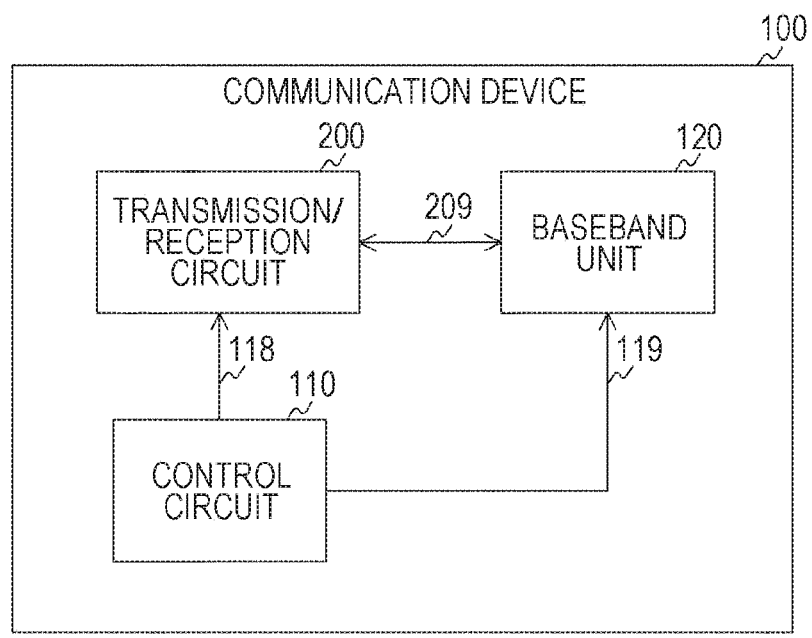
FIG. 2 is a block diagram illustrating an exemplary configuration of a communication device according to an embodiment.

[Exemplary Configuration of Communication Device]
FIG. 2 is a block diagram illustrating an exemplary configuration of a communication device 100 according to an embodiment. The communication device 100 includes a transmission/reception circuit 200, a control circuit 110, and a baseband unit 120.

In accordance with the control of the control circuit 110, the transmission/reception circuit 200 transmits a transmission signal and receives a reception signal. These transmission signal and reception signal are transmitted via a signal line 209 between the baseband unit 120 and the transmission/reception circuit 200. Moreover, a differential signal including a positive side signal and a negative side signal is used, for example, as the transmission signal and the reception signal. Note that while differential signals are used as the transmission signal and the reception signal are, it is allowable to use single-ended signals.

In accordance with the control of the control circuit 110, the baseband unit 120 generates a transmission signal and processes the reception signal. The baseband unit 120 modulates a baseband signal, for example, and generates a signal having a frequency of several hundreds to several tens of megahertz (MHz) as a transmission signal. Moreover, the baseband unit 120 demodulates the reception signal from another device and performs predetermined processing.

The control circuit 110 controls the overall communication device 100. In the time slot of the transmission period of the communication device 100, the control circuit 110 controls the baseband unit 120 to perform modulation, and controls the transmission/reception circuit 200 to transmit the transmission signal. Moreover, the control circuit 110 controls the transmission/reception circuit 200 to receive the reception signal in the time slot of the reception period of the communication device 100, and controls the baseband unit 120 to perform demodulation.

Note that the circuit in the communication device 100 is an exemplary communication apparatus described in the appended claims.

Figure 3:
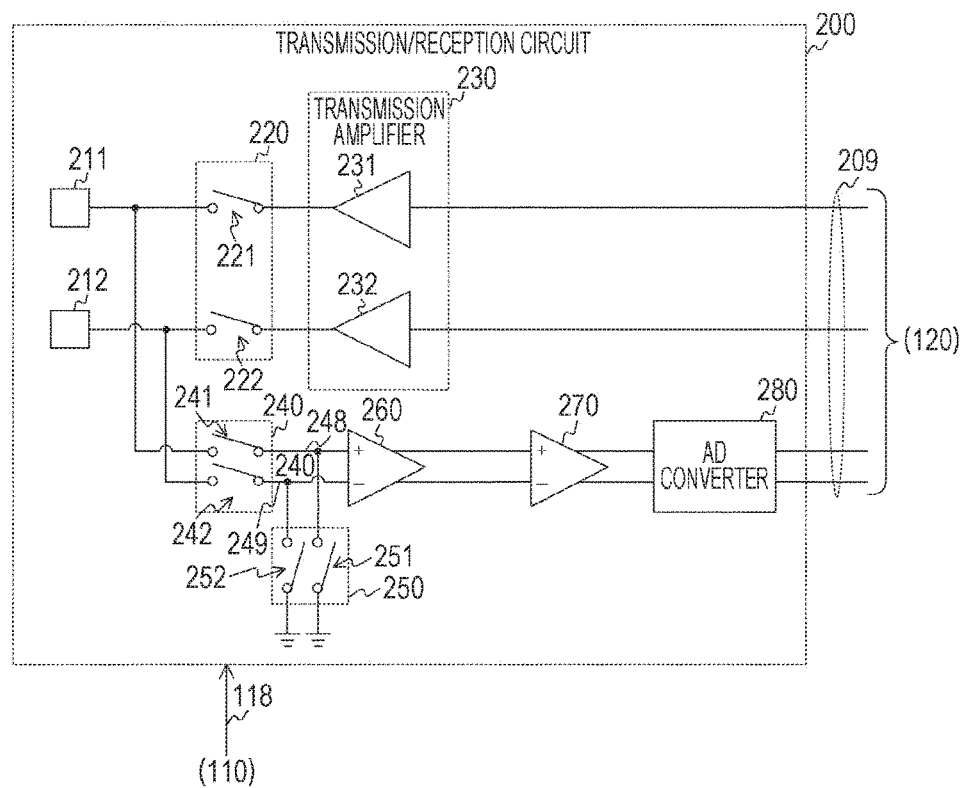
FIG. 3 is a circuit diagram illustrating an exemplary configuration of a transmission/reception circuit according to an embodiment.

[Exemplary Configuration of Transmission/Reception Circuit]
FIG. 3 is a circuit diagram illustrating an exemplary configuration of the transmission/reception circuit 200 according to an embodiment. The transmission/reception circuit 200 includes electrodes 211 and 212, a transmission side switching unit 220, a transmission amplifier 230, a reception side switching unit 240, a discharge unit 250, a reception amplifier 260, an input amplifier 270, an analog-to-digital (AD) converter 280.

Moreover, the transmission side switching unit 220 includes a positive side transmission switch 221 and a negative side transmission switch 222, and the transmission amplifier 230 includes a positive side transmission amplifier 231 and a negative side transmission amplifier 232. The reception side switching unit 240 includes a positive side reception switch 241 and a negative side reception switch 242, and the discharge unit 250 includes a positive side discharge switch 251 and a negative side discharge switch 252.

One of the electrodes 211 and 212 is arranged at a position in contact with or close to the human body. An electric field is generated on a surface of the human body by the voltage applied to these electrodes, and human body communication with the human body as a communication path is performed. Note that each of the electrodes 211 and 212 is an example of one end of the communication path described in the appended claims.

For example, an N-type metal-oxide-semiconductor (MOS) transistor is used as the positive side discharge switch 251 and the negative side discharge switch 252. Similarly, for example, the N-type MOS transistor is used for the positive side transmission switch 221, the negative side transmission switch 222, the positive side reception switch 241 and the negative side reception switch 242.

Note that the transistor constituting the positive side transmission switch 221 and the negative side transmission switch 222 is an exemplary transmission transistor described in the appended claims. Moreover, the transistor constituting the positive side reception switch 241 and the negative side reception switch 242 is an exemplary reception transistor described in the appended claims.

The positive side transmission switch 221 opens and closes a path between the electrode 211 and the positive side transmission amplifier 231 in accordance with the control of the control circuit 110. The negative side transmission switch 222 opens and closes a path between the electrode 212 and the negative side transmission amplifier 232 in accordance with the control of the control circuit 110.

The positive side transmission amplifier 231 amplifies the positive side signal of the transmission signal from the baseband unit 120. The positive side transmission amplifier 231 supplies the amplified positive side signal to the positive side transmission switch 221. The negative side transmission amplifier 232 amplifies the negative side signal of the transmission signal from the baseband unit 120. The negative side transmission amplifier 232 supplies the amplified negative side signal to the negative side transmission switch 222. An exemplary amplitude of the amplified transmission signal is about 3.6 volt (V). Each of the positive side transmission amplifier 231 and the negative side transmission amplifier 232 is an exemplary transmission unit described in the appended claims.

The positive side reception switch 241 opens and closes a path between the electrode 211 and the reception amplifier 260 in accordance with the control of the control circuit 110. The negative side reception switch 242 opens and closes a path between the electrode 212 and the reception amplifier 260 in accordance with the control of the control circuit 110.

Note that the circuit including the positive side transmission switch 221, the negative side transmission switch 222, the positive side reception switch 241, and the negative side reception switch 242 is an exemplary switching unit described in the appended claims.

The positive side discharge switch 251 opens and closes a path between a signal line 248 and the ground terminal in accordance with the control of the control circuit 110. Note that the signal line 248 is a signal line arranged between the positive side reception switch 241 and a non-inverted input terminal (+) of the reception amplifier 260. The negative side discharge switch 252 opens and closes a path between a signal line 249 and the ground terminal in accordance with the control of the control circuit 110. Note that the signal line 249 is a signal line arranged between the negative side reception switch 242 and an inverted input terminal (−) of the reception amplifier 260. When the control circuit 110 controls to set both of the positive side discharge switch 251 and the negative side discharge switch 252 to a closed state, the current is discharged as a forced discharge from the reception side switching unit 240 to the ground terminal. Note that the forced discharge means the discharge with a higher discharge speed than the self-discharge of the transmission side switching unit 220 and the power reception side switching unit 240 when the discharge unit 250 is opened.

The reception amplifier 260 receives and amplifies the reception signal from the reception side switching unit 240. The reception amplifier 260 supplies the amplified reception signal to the input amplifier 270.

The input amplifier 270 further amplifies the reception signal amplified by the reception amplifier 260. The input amplifier 270 supplies the amplified reception signal to the AD converter 280. Note that a circuit including the reception amplifier 260 and the input amplifier 270 is an exemplary reception unit described in the appended claims.

Note that the amplitude of the reception signal in the BAN is on the order of one millivolt (mV), for example, which is much smaller compared with the amplitude of the transmission signal (one volt, etc.). Accordingly, the gain by the reception amplifier 260 and the input amplifier 270 is set to a very large value, for example, 60 decibels (dB) as compared with the transmission amplifier 230.

The AD converter 280 converts an analog reception signal from the input amplifier 270 into a digital signal and supplies the signal to the baseband unit 120.

When causing the communication device 100 to perform transmission, the control circuit 110 controls the transmission side switching unit 220 to be shifted to the closed state, and controls the reception side switching unit 240 to be shifted to the open state. Moreover, when switching from transmission to reception, the control circuit 110 shifts the transmission side switching unit 220 to the open state, and then shifts the discharge unit 250 to the closed state. Then, the control circuit 110 shifts the reception side switching unit 240 to the closed state. With this configuration, the connection destination of one end (electrodes 211 and 212) of the communication path is switched from the transmission amplifier 230 to the reception amplifier 260.

In this switching, a DC offset voltage (in other words, a surge voltage) is generated in the transmission side switching unit 220. This is generated because the charge accumulated in the capacitive component of the MOS transistor is released when the MOS transistor in the transmission side switching unit 220 transitions from the closed state to the open state. This phenomenon is referred to as charge injection. While the DC offset voltage generated at the time of reception is as small as about 10 millivolts (mV), for example, the signal from the reception side switching unit 240 is amplified with a very large gain (60 decibels, etc.) by the reception amplifier 260, or the like, as described above. Accordingly, in a case where the DC offset voltage is input into the reception amplifier 260, there is a possibility that a signal amplified with a high gain is supplied to the baseband unit 120 and the reception signal cannot be accurately demodulated. Accordingly, in the circuit without the discharge unit 250, disclosed in Patent Document 1, or the like, in a case where it is assumed that t nanoseconds are needed for sufficiently lowering the DC offset voltage by self-discharge, it would be necessary to provide an interval of t nanoseconds or more between transmission and reception.

In contrast, the transmission/reception circuit 200 includes the discharge unit 250 that is shifted to the closed state at the time of switching, and therefore, the current is discharged as a forced discharge to the ground terminal via the discharge unit 250 in the closed state, lowering the DC offset voltage. As a result, it is possible to accurately demodulate the reception signal even when the interval between transmission and reception is less than t nanoseconds. Since the interval between transmission and reception can be reduced in this manner, it is possible to enhance the communication speed.

In particular, it is desirable that the control circuit 110 controls the discharge unit 250 to discharge solely when the connection destination of the electrodes 211 and 212 is switched from the transmission amplifier 230 to the reception amplifier 260. This is because, as described above, the DC offset voltage at the time of reception is amplified with a high gain. In contrast, since the DC offset voltage generated at the time of transmission is not amplified within the communication device 100, it is not necessary to cause the discharge unit 250 to discharge at the time of switching to the transmission amplifier 230. Note that, from the viewpoint of further enhancing communication quality, the control circuit 110 may cause the discharge unit 250 to discharge even at the time of switching to the transmission amplifier 230 in addition to the time of switching to the reception amplifier 260 as the connection destination.

Note that, generally, the greater the gate width of the MOS transistor, the greater the capacitive component of the transistor and the drain current (in other words, driving capability) in the conductive state. Moreover, the capacitive component generated between the electrodes 211 and 212 is often greater than the capacitive component of the reception amplifier 260. Therefore, for the purpose of charging a relatively great capacitive component, the gate width of the MOS transistor in the transmission side switching unit 220 is set to a greater value than in the gate width of the MOS transistor in the reception side switching unit 240. In contrast, it is desirable to set the gate width of the MOS transistor in the discharge unit 250 to a smaller value than any of the transmission side switching unit 220 and the reception side switching unit 240. With this setting, the capacitive component of the discharge unit 250 becomes relatively small, and when the discharge unit 250 is switched from the closed state to the open state, almost no DC offset voltage is generated.

Figure 4:
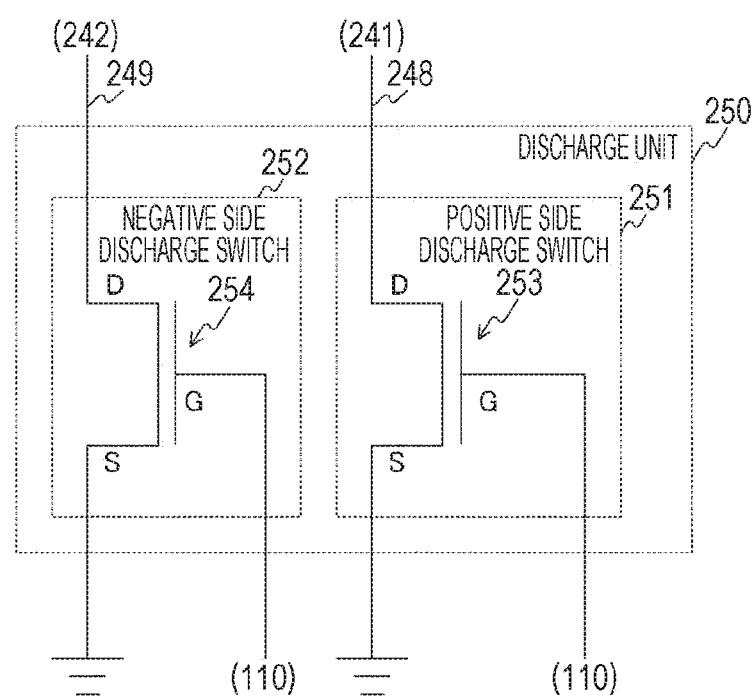
FIG. 4 is a circuit diagram illustrating an exemplary configuration of a discharge unit according to an embodiment.

FIG. 4 is a circuit diagram illustrating an exemplary configuration of the discharge unit 250 according to an embodiment. In the discharge unit 250, the positive side discharge switch 251 is constituted with a positive side N-type transistor 253, while the negative side discharge switch 252 is formed by a negative side N-type transistor 254. For example, a MOS transistor is used as the positive side N-type transistor 253 and the negative side N-type transistor 254. Note that the positive side N-type transistor 253 and the negative side N-type transistor 254 are exemplary discharge transistors described in the appended claims.

The gate of the positive side N-type transistor 253 is connected to the control circuit 110, the source is connected to the ground terminal, and the drain is connected to the signal line 248. Moreover, the gate of the negative side N-type transistor 254 is connected to the control circuit 110, the source is connected to the ground terminal, and the drain is connected to the signal line 249.

When the control circuit 110 supplies a high-level control signal to the gate of each of the positive side N-type transistor 253 and the negative side N-type transistor 254, each of the transistors transitions to the conductive state. With this configuration, each of the positive side discharge switch 251 and the negative side discharge switch 252 transitions to the closed state. Moreover, when the control circuit 110 supplies a low-level control signal to the gate of each of the positive side N-type transistor 253 and the negative side N-type transistor 254, each of the transistors transitions to the non-conductive state. With this configuration, each of the positive side discharge switch 251 and the negative side discharge switch 252 transitions to the open state.

[Exemplary Operation of Communication System]

Figure 5:
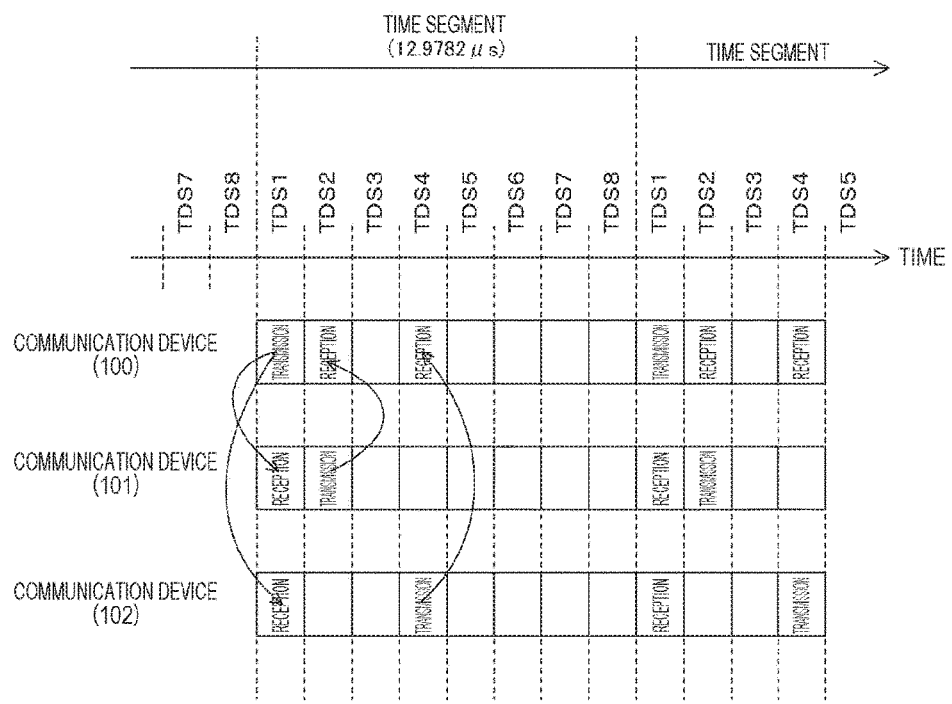
FIG. 5 is a timing chart illustrating exemplary operation of the communication system according to an embodiment.

FIG. 5 is a timing chart illustrating exemplary operation of the communication system according to an embodiment. According to ISO/IEC 17982, time is divided by units referred to time segments, and each of the time segments is further divided into eight time division slots (TDS). For example, the length of the TDS is 1622.28 nanoseconds (ns) and the length of the time segment is 12.9782 microseconds (μs). Hereinafter, the TDS in the time segment will be referred to as TDS1 to TDS8. Note that, for example, the transmission period of the communication device 100 and the reception period of each of the communication devices 101 and 102 are allocated to the TDS1. Moreover, the reception period of the communication device 100 and the transmission period of 101 are allocated to the TDS2, and the reception period of the communication device 100 and the transmission period of the communication device 102 are allocated to the TDS4.

In this case, the communication device 100 can transmit a transmission signal in the TDS1, and the communication device 101 and 102 can receive the transmission signal. Moreover, the communication device 100 can receive the transmission signal transmitted by the communication device 101 in the TDS2, and the communication device 100 can receive the transmission signal transmitted by the communication device 102 in the TDS4. In this manner, the time division multiplexing system enables a plurality of communication device can communicate by segmenting time with a time slot (for example, TDS).

Figure 6:
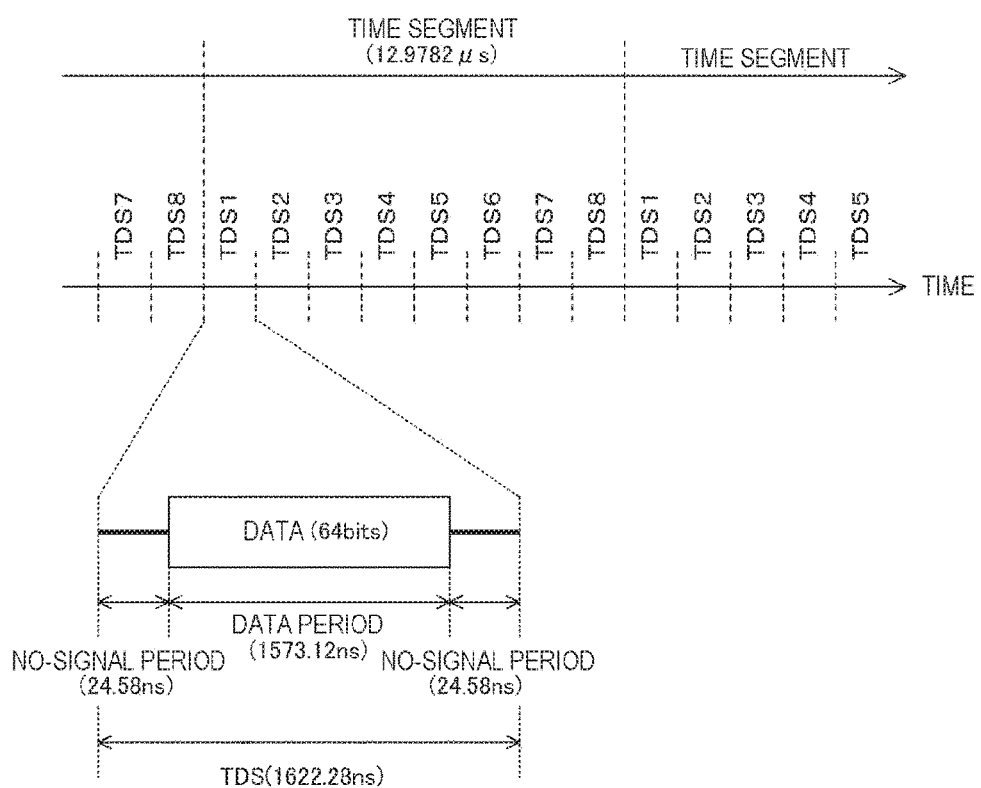
FIG. 6 is a diagram illustrating an exemplary data transmission/reception period within a time slot according to an embodiment.

FIG. 6 is a diagram illustrating an exemplary data transmission/reception period within a time slot (TDS) according to an embodiment. A no-signal period during which no data are transmitted/received is set in a period from a start timing of TDS until 24.58 nanoseconds (ns) elapses. A data period for transmitting and receiving 64-bit data is set in a period from a point when the no-signal period has elapsed until 1573.12 nanoseconds elapses. A no-signal period is also set in a period from this data period elapses until 24.58 nanoseconds (ns) elapses. When the communication device 100 switches to reception immediately after transmission, it is necessary to complete switching operation of transmission/reception within these very short no-signal periods.

Figure 7A:
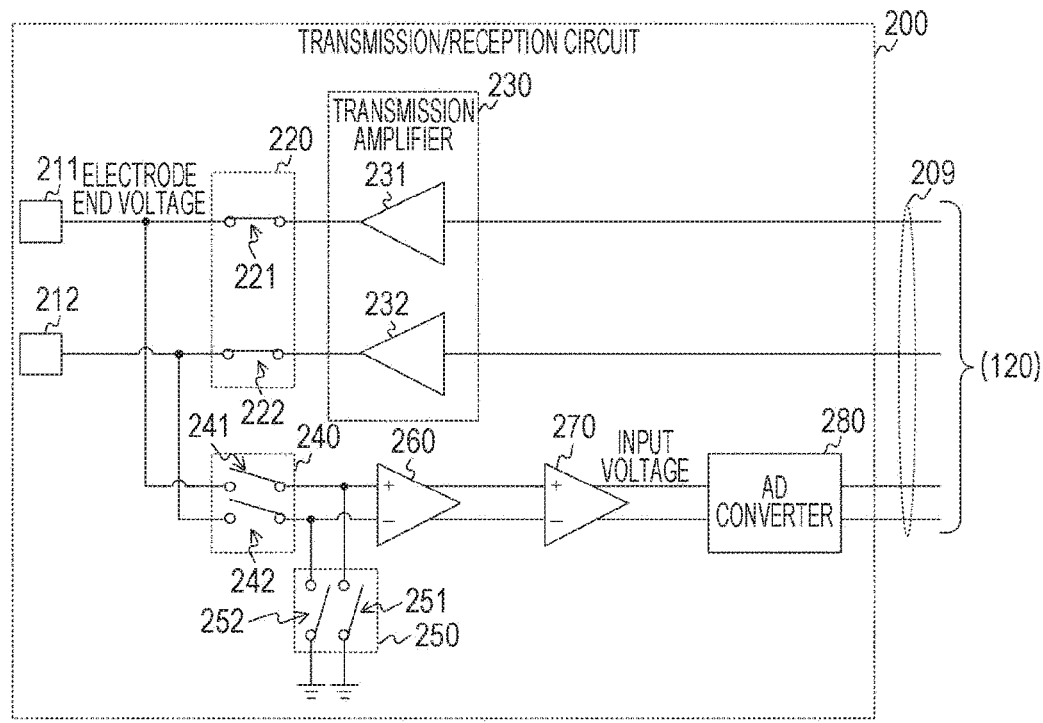
FIGS. 7a, 7b, 7c and 7d are diagrams for explaining a state of a transmission/reception circuit at the time of transmission according to an embodiment.
Figure 7B:
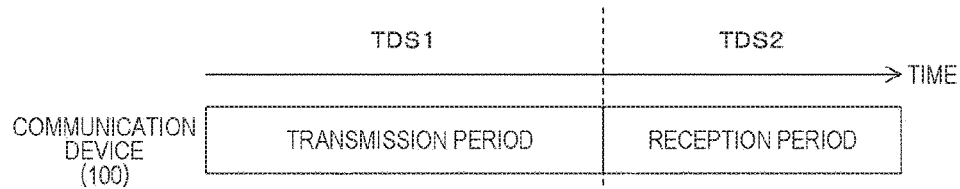
Figure 7C:
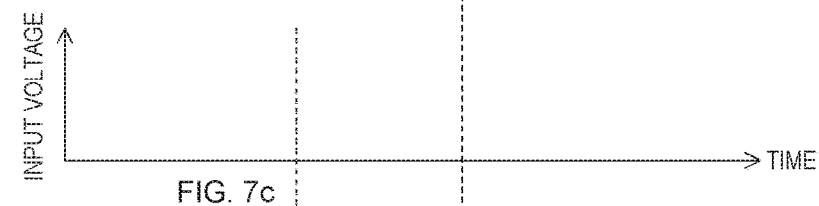
Figure 7D:
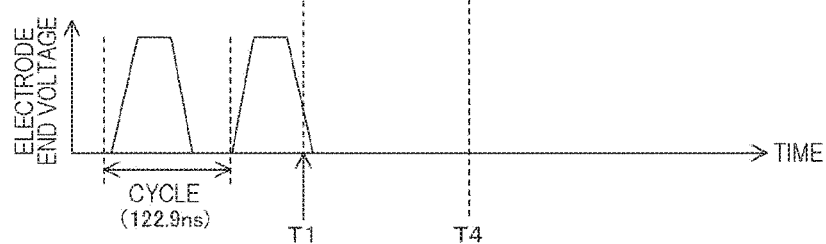

FIGS. 7a, 7b, 7c and 7d are diagrams for explaining the state of the transmission/reception circuit 200 at the time of transmission according to an embodiment. FIG. 7a is a diagram illustrating the state of the transmission/reception circuit 200 at the time of transmission, and FIG. 7b is a timing chart illustrating the transmission period and the reception period of the communication device 100. Moreover, FIG. 7c is a graph illustrating the fluctuation of the input voltage, and FIG. 7d is a graph illustrating fluctuation of the electrode end voltage. Moreover, in FIG. 7c, the vertical axis indicates the electrode end voltage and the horizontal axis indicates time. In FIG. 7d, the vertical axis indicates the input voltage and the horizontal axis indicates the time. Herein, the input voltage is the voltage between the positive side output terminal and the negative side output terminal of the input amplifier 270, and the electrode end voltage is the voltage between the electrodes 211 and 212.

It is assumed that the transmission period is allocated to TDS1 as illustrated in FIG. 7b. In TDS1, a rectangular wave having a cycle of 122.9 nanoseconds (ns), for example, is transmitted as a transmission signal, as illustrated by FIG. 7d. At a timing T1 in FIG. 7d, as illustrated in a of the figure, the transmission side switching unit 220 is in the closed state, and the reception side switching unit 240 and the discharge unit 250 are in the open states. Moreover, since the reception signal is not received, the input voltage is in a low-level state, as illustrated by FIG. 7c.

Figure 8A:
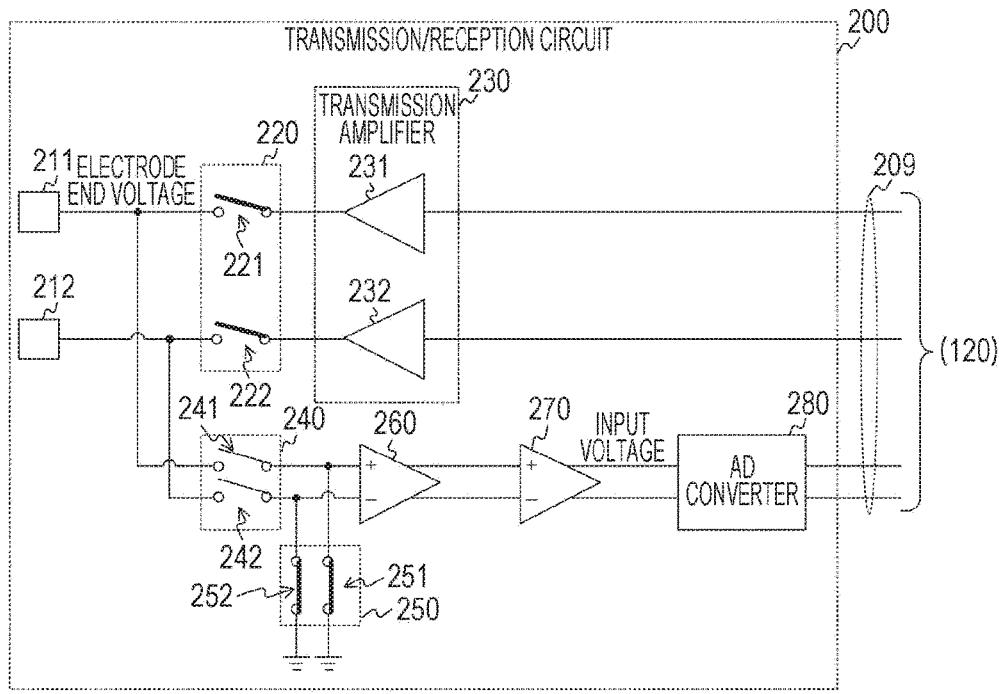
FIGS. 8a, 8b, 8c and 8d are diagrams for explaining a state of a transmission/reception circuit immediately before switching in an embodiment.
Figure 8B:
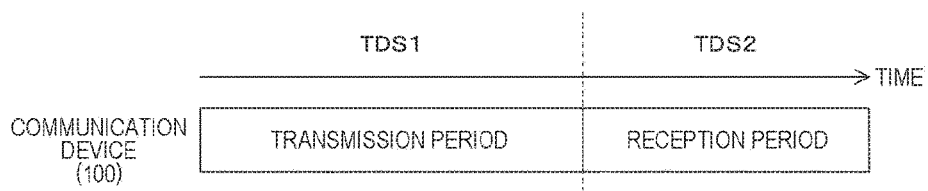
Figure 8C:
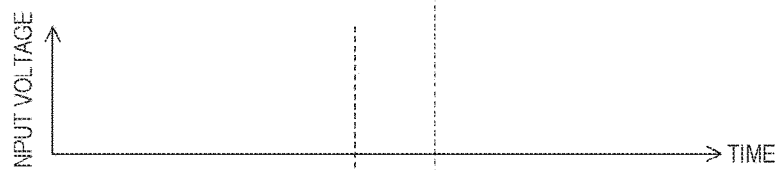
Figure 8D:
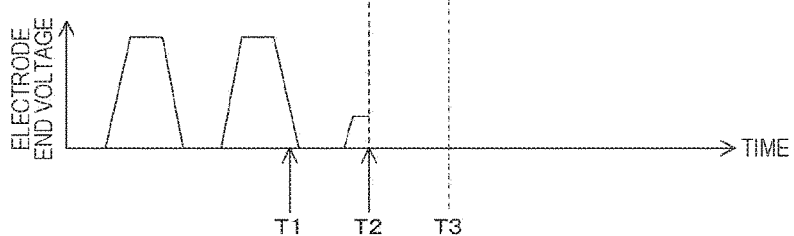

FIGS. 8a, 8b, 8c and 8d are diagrams for explaining the state of the transmission/reception circuit 200 immediately before switching in an embodiment. FIG. 8a are diagrams illustrating the state of the transmission/reception circuit 200 immediately before the switching, and FIG. 8b are timing chart illustrating the transmission period and the reception period of the communication device 100. Moreover, FIG. 8c are graph illustrating the fluctuation of the input voltage, and FIG. 8d are graph illustrating fluctuation of the electrode end voltage.

It is assumed that the transmission period is allocated to TDS1 as illustrated in FIG. 8b, and the reception period is allocated to the next TDS, namely, TDS2. At a timing T2, which is a predetermined time before a timing T3 of the transition from the TDS1 to the TDS2, the control circuit 110 shifts the transmission side switching unit 220 to the open state and shifts the discharge unit 250 to the closed state.

Figure 9A:
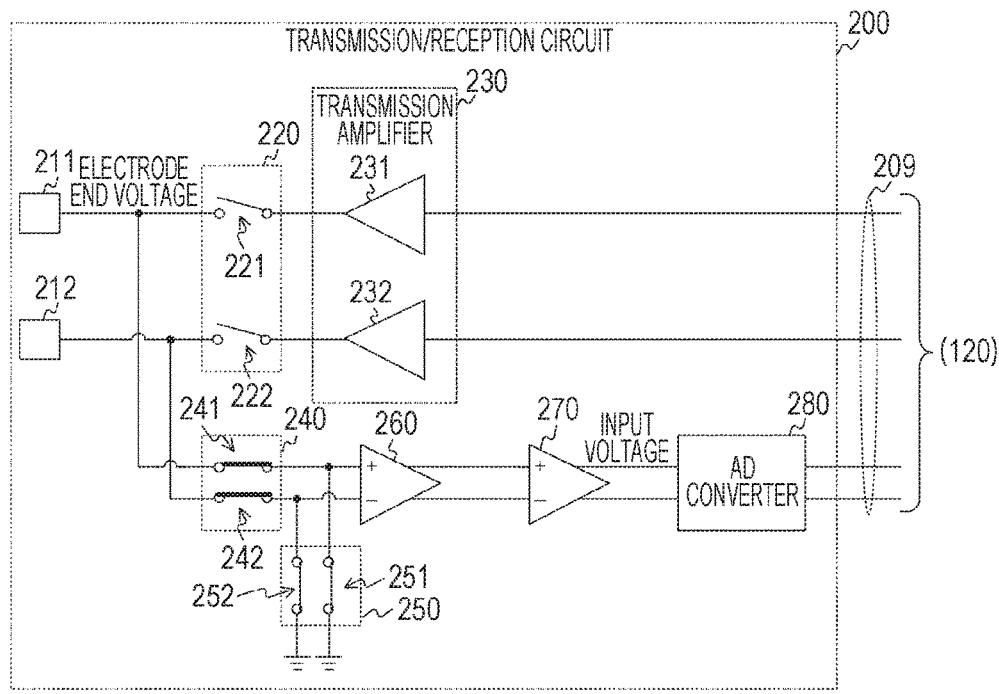
FIGS. 9a, 9b, 9c and 9d are diagrams for explaining a state of a transmission/reception circuit at the time of switching in an embodiment.
Figure 9B:
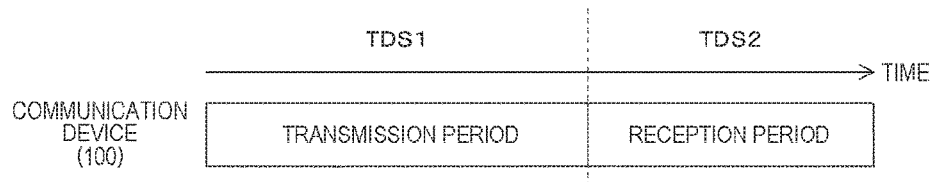
Figure 9C:
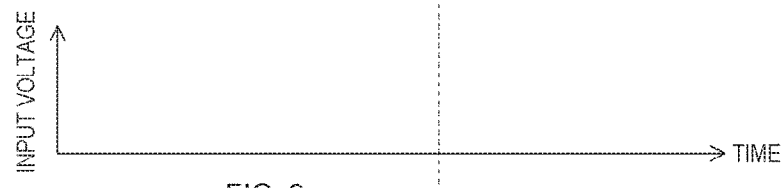
Figure 9D:
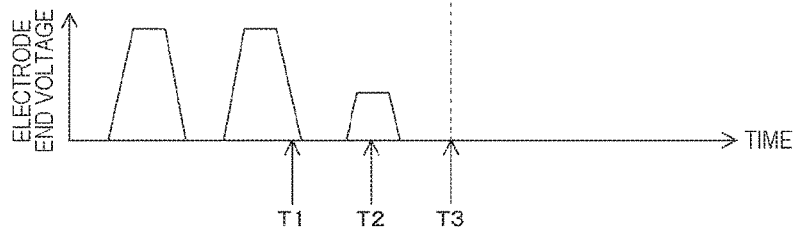

FIGS. 9a, 9b, 9c and 9d are diagrams for explaining the state of the transmission/reception circuit 200 at the time of switching in an embodiment. FIG. 9a is a diagram illustrating the state of the transmission/reception circuit 200 at the time of the switching, and FIG. 9b is a timing chart illustrating the transmission period and the reception period of the communication device 100. Moreover, FIG. 9c is a graph illustrating fluctuation of the input voltage, and FIG. 9d is a graph illustrating fluctuation of the electrode end voltage.

At the timing T3 of transition from TDS1 to TDS2, the control circuit 110 shifts the reception side switching unit 240 to the closed state, as illustrated a of the figure. At this time, since the discharge unit 250 is in the closed state, the DC offset voltage is lowered due to forced discharge. With this configuration, as illustrated by c of the figure, there is no generation of input voltage corresponding to the DC offset voltage.

Figure 10A:
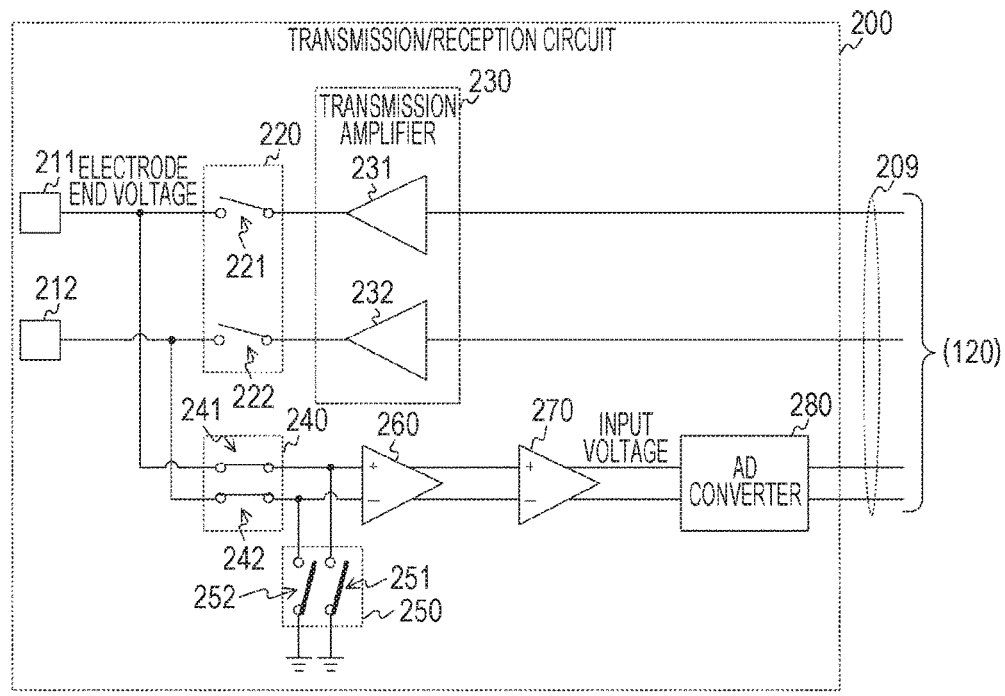
FIGS. 10a, 10b, 10c and 10d are diagrams for explaining a state of a transmission/reception circuit at the time of reception according to an embodiment.
Figure 10B:
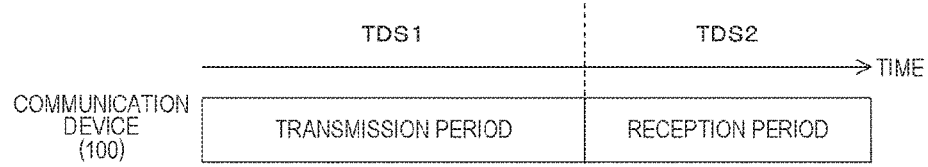
Figure 10C:
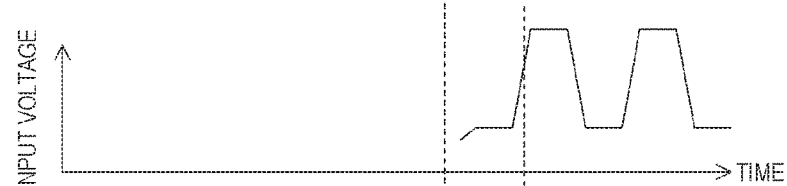
Figure 10D:
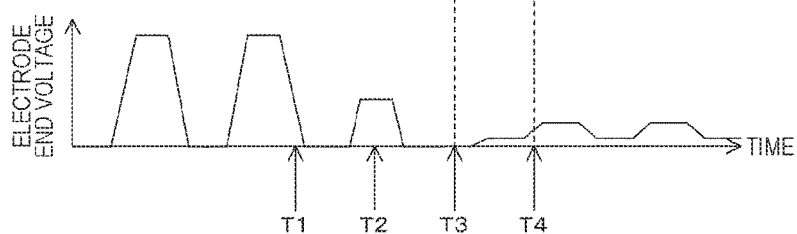

FIGS. 10a, 10b, 10c and 10d are diagram for explaining the state of the transmission/reception circuit 200 at the time of reception according to an embodiment. FIG. 10a is a diagram illustrating the state of the transmission/reception circuit 200 at the time of reception, and FIG. 10b is a timing chart illustrating the transmission period and the reception period of the communication device 100. Moreover, FIG. 10c is a graph illustrating fluctuation of the input voltage, and FIG. 10d is a graph illustrating fluctuation of the electrode end voltage.

Immediately before a timing T4 when a predetermined time has elapsed from the start timing of the TDS2, the control circuit 110 controls the discharge unit 250 to be set to the open state, as illustrated by FIG. 10a. At this time, there is a concern that a DC offset voltage might be generated in the discharge unit 250 due to charge injection. As described above, however, substantially no DC offset voltage is generated as illustrated by FIG. 10c, with the gate width of the transistor in the discharge unit 250 being sufficiently small. After the timing T4, the reception signal is received as illustrated by FIG. 10d, and amplified as illustrated by FIG. 10c.

Figure 11A:
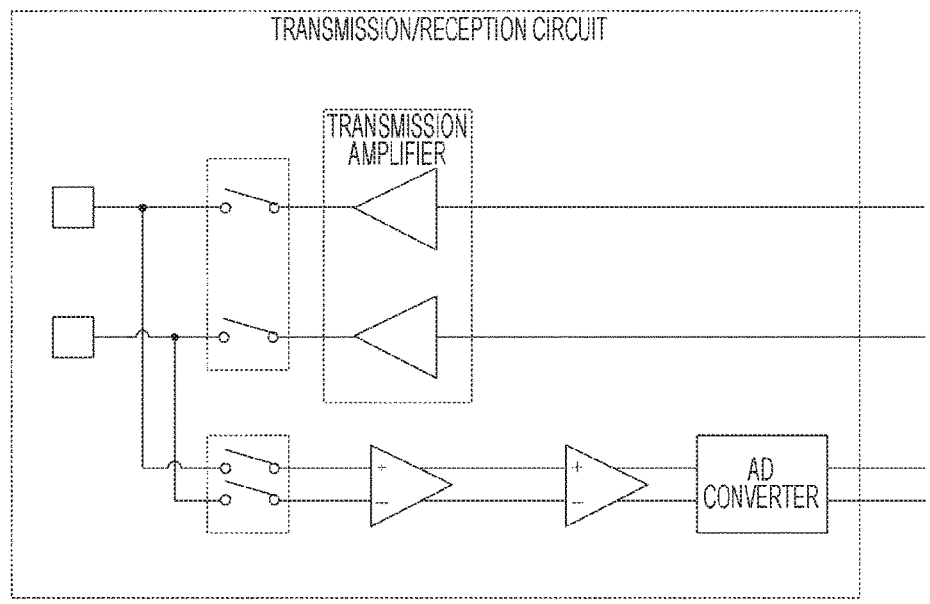
FIGS. 11a and 11b are diagrams illustrating a transmission/reception circuit in a comparative example and a timing chart illustrating its operation.
Figure 11B:
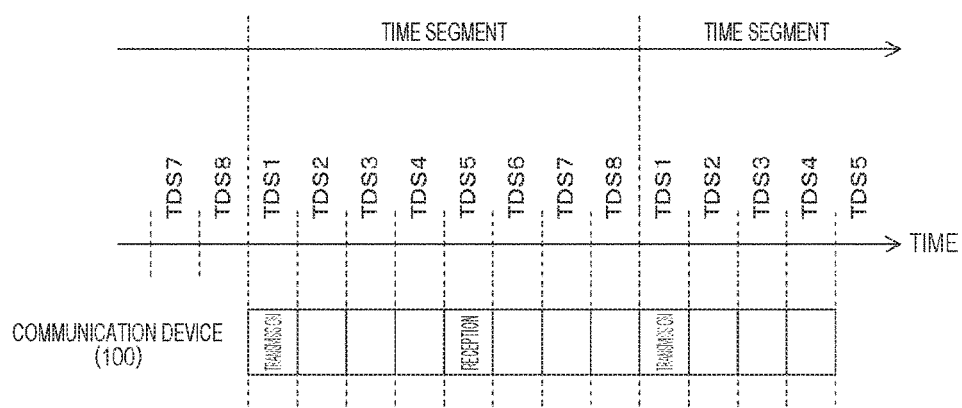

FIGS. 11a and 11b are diagrams illustrating a transmission/reception circuit in a comparative example and a timing chart illustrating operation of the circuit. As a comparative example, a transmission/reception circuit without the discharge unit 250 is assumed as illustrated in Patent Document 1. FIG. 11a is a circuit diagram of the transmission/reception circuit in the comparative example, and FIG. 11b is a timing chart illustrating the operation of the transmission/reception circuit in the comparative example.

In the comparative example without the discharge unit 250 as illustrated in FIG. 11a, a DC offset voltage (surge voltage) is generated at the transmission side switching unit 220 at the time of switching from transmission to reception. In order to suppress the generation of a communication error due to this voltage, it is necessary to provide a sufficient interval between transmission and reception. For example, in a case where it is assumed that lowering the surge voltage to a certain value or below by self-discharge needs three slots, the communication device would perform communication with three slot intervals between the transmission time slot and the reception time slot, as illustrated in FIG. 11b. Reducing the interval between transmission and reception to less than three slots might cause an error due to the DC offset voltage, leading to a difficulty in enhancing the communication speed.

In contrast, in the transmission/reception circuit 200 of the present technology, since the discharge unit 250 lowers the DC offset voltage by forced discharge at the time of switching, the communication device 100 can set the interval between transmission and reception to be shorter than three slots. With this configuration, it is possible to enhance the communication speed.

[Exemplary Operation of Control Circuit]

Figure 12:
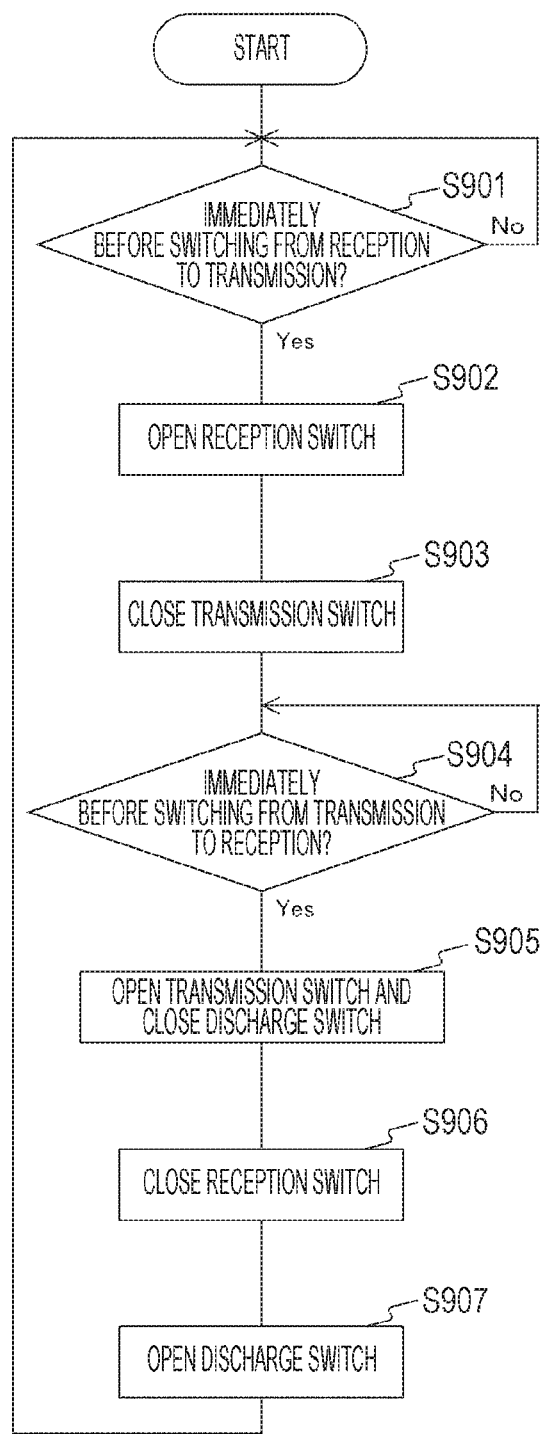
FIG. 12 is a flowchart illustrating exemplary operation of a control circuit in an embodiment.

FIG. 12 is a flowchart illustrating exemplary operation of the control circuit 110 in an embodiment. The operation is started when the communication device 100 is connected to the BAN, for example. Moreover, it is assumed that the communication device 100 alternately repeats transmission and reception. The control circuit 110 determines whether it is a timing immediately before switching from reception to transmission (step S901). In a case where it is not immediately before switching (step S901: No), the control circuit 110 repeats step S901.

In contrast, in a case where it is immediately before switching (step S901: Yes), the control circuit 110 sets the positive side reception switch 241 and the negative side reception switch 242 to the open states (step S902). Then, the control circuit 110 sets the positive side transmission switch 221 and the negative side transmission switch 222 to the closed states (step S903). The control circuit 110 determines whether it is a timing immediately before switching from transmission to reception (step S904). In a case where it is not immediately before switching (step S904: No), the control circuit 110 repeats step S904.

In contrast, in a case where it is immediately before switching (step S904: Yes), the control circuit 110 sets the positive side transmission switch 221 and the negative side transmission switch 222 to the open states, and sets the positive side discharge switch 251 and the negative side discharge switch 252 to the closed states (step S905). Then, the control circuit 110 sets the positive side reception switch 241 and the negative side reception switch 242 to the closed states (step S906) and sets the positive side discharge switch 251 and the negative side discharge switch 252 to the open states (step S907). After step S907, the control circuit 110 repeats step S901 and the following steps.

Note that while the control circuit 110 holds the discharge unit 250 in the open state at the time of switching from reception to transmission, the control may be performed similarly to the case of switching from transmission to reception. That is, the control circuit 110 may further set the discharge unit 250 to the closed state in step S902 and may set the discharge unit 250 to the open state after step S903. With this configuration, it is possible to lower the DC offset voltage at the time of transmission by forced discharge.

As described above, according to the first embodiment of the present technology, the communication device 100 lowers, by discharging, the surge voltage generated by switching the connection destination of the electrode ends 211 and 212. Accordingly, it is possible to reduce the interval between the transmission and the reception than in the case where there is no discharging. With this configuration, it is possible to enhance the communication speed.

<2. First Modification Example>

While, in the above-described embodiment, the switch such as the positive side discharge switch 251 is realized by the N-type MOS transistor, the switch may be realized by the P-type MOS transistor. The communication device 100 according to the first modification example is different from the embodiment in that the switch is realized by a P-type MOS transistor.

Figure 13:
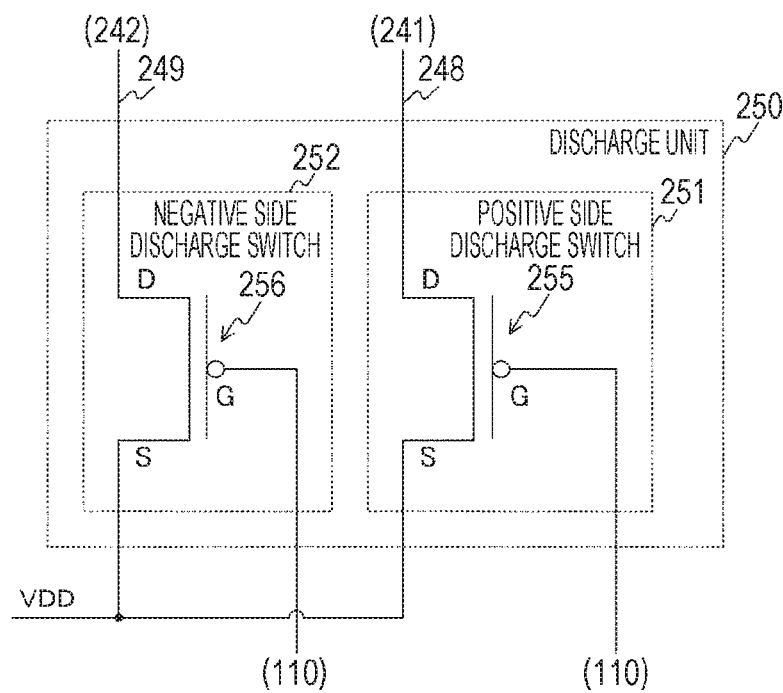
FIG. 13 is a circuit diagram illustrating an exemplary configuration of a discharge unit in a first modification example of an embodiment.

FIG. 13 is a circuit diagram illustrating an exemplary configuration of the discharge unit 250 according to the first modification example of the embodiment. The discharge unit 250 of the first modification example is different from the embodiment in that a positive side P-type transistor 255 and a negative side P-type transistor 256 are provided instead of the positive side N-type transistor 253 and the negative side N-type transistor 254, respectively. For example, a MOS transistor is used as the positive side P-type transistor 255 and the negative side P-type transistor 256.

On the positive side P-type transistor 255, the gate is connected to the control circuit 110, the source is connected to the power supply terminal, and the drain is connected to the signal line 248. On the negative side P-type transistor 256, the gate is connected to the control circuit 110, the source is connected to the power supply terminal, and the drain is connected to the signal line 249.

Similarly, note that it is desirable to realize also the positive side transmission switch 221, the negative side transmission switch 222, the positive side reception switch 241 and the negative side reception switch 242 with the P-type MOS transistors.

In this manner, according to the first modification example of the present technology, the communication device 100 uses the P-type transistor as a switch, and thus, the communication device 100 can control the switch to be set to the closed state by a low-level control signal.

<3. Second Modification Example>

While in the above-described embodiment, the discharge unit 250 is configured with two switches, it is also possible to reduce the number of components such as switches in the discharge unit 250. The communication device 100 of a second modification example is different from the embodiment in that the number of components is reduced.

Figure 14:
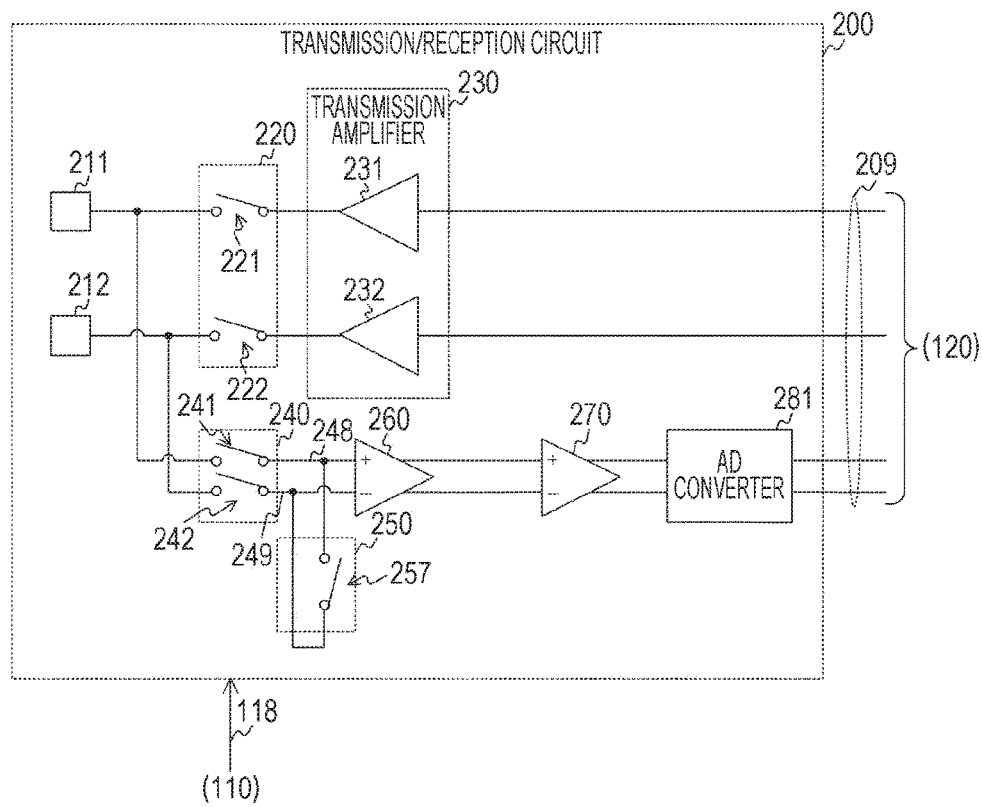
FIG. 14 is a circuit diagram illustrating an exemplary configuration of a transmission/reception circuit in a second modification example of an embodiment.

FIG. 14 is a circuit diagram illustrating an exemplary configuration of a transmission/reception circuit in the second modification of the embodiment. The discharge unit 250 of the second modification example is different from the embodiment in that it includes a short circuit switch 257 instead of the positive side discharge switch 251 and the negative side discharge switch 252, and includes an AD converter 281 instead of the AD converter 280.

The short circuit switch 257 opens and closes a path between the signal line 248 and the signal line 249 in accordance with the control of the control circuit 110. The shift of the short circuit switch 257 to the closed state causes a short circuit of the positive side signal line 249 and the negative side signal line 249, leading to the discharge of the current from the positive side transmission switch 221 to the negative side transmission switch 222.

The AD converter 281 is different from the AD converter 280 of the embodiment in that it further includes a circuit for correcting the common potential of the positive side signal and the negative side signal into the ground potential in addition to the circuit that performs AD conversion. In the configuration of realizing the discharge unit 250 with the short circuit switch 257 alone, the potential of each of the positive side signal and the negative side signal is not set to the ground potential when the short circuit switch 257 is set to the closed state. This would cause fluctuation in the common potential thereof, and a malfunction of subsequent stages such as AD converter 280, leading to a failure in receiving data accurately. Fortunately, however, due to the AD converter 281 for correcting the common potential provided instead of the AD converter 280, the communication device 100 can accurately transmit and receive data. Note that while the circuit for correcting the common potential is provided inside the AD converter 281, it may be provided outside the AD converter. Moreover, in the case where the fluctuation of the common potential is relatively small and the possibility of malfunction of the subsequent circuit is low, there is no need to provide a circuit for correcting the common potential.

Figure 15:
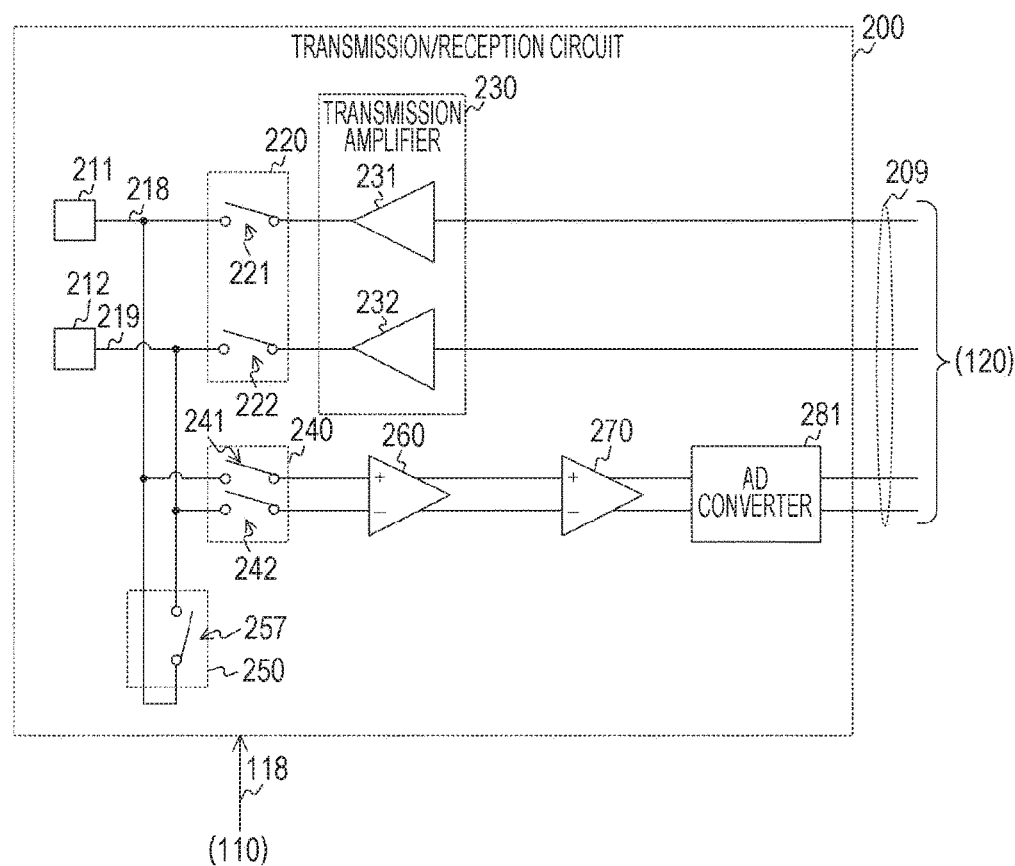
FIG. 15 is a circuit diagram illustrating an exemplary configuration of a transmission/reception circuit in which a discharge unit is provided in a stage preceding a transmission side switching unit in the second modification example of an embodiment.
Figure 16:
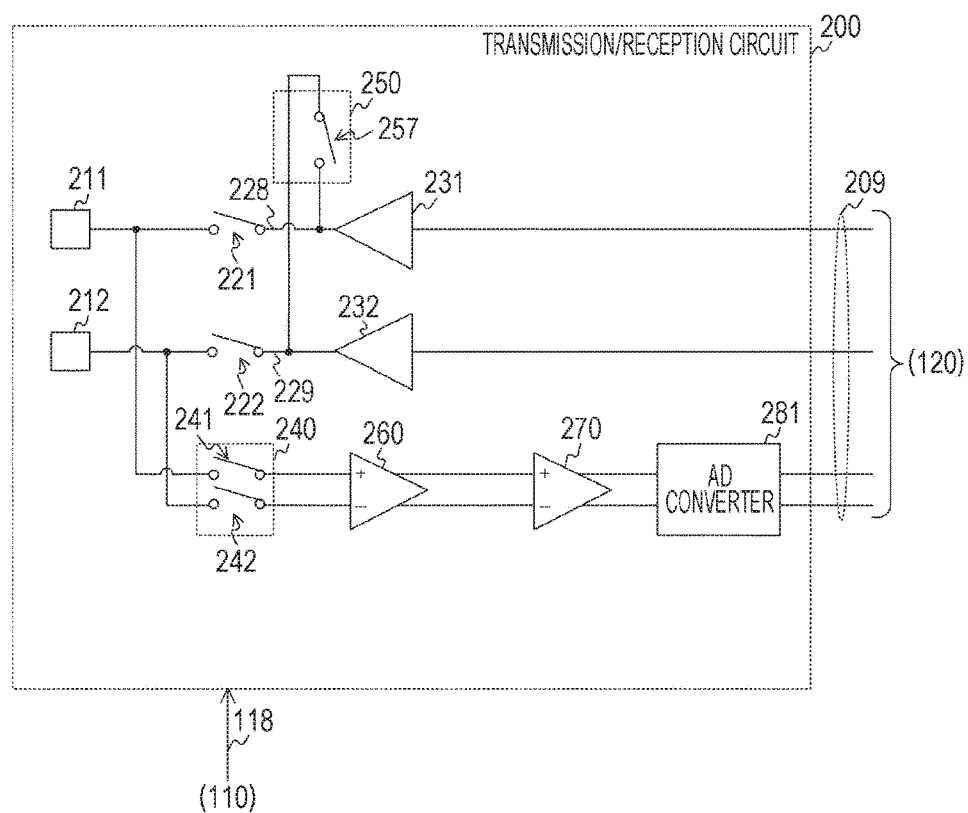
FIG. 16 is a circuit diagram illustrating an exemplary configuration of a transmission/reception circuit in which a discharge unit is provided at a stage following the transmission side switching unit in the second modification example of an embodiment.

Note that while the short circuit switch 257 is connected to each of the signal lines 248 and 249, it may be connected to other signal lines. For example, as illustrated in FIG. 15, short circuit switch 257 may be connected to signal lines 218 and 219. Note that the signal line 218 is a signal line arranged between the electrode 211 and the transmission side switching unit 220 and between the electrode 211 and the reception side switching unit 240, and note that the signal line 219 is a signal line arranged between the electrode 212 and the transmission side switching unit 220 and between the electrode 212 and the reception side switching unit 240. Moreover, as illustrated in FIG. 16, the short circuit switch 257 may be connected to each of the signal lines 228 and 229. Note that the signal line 228 is a signal line arranged between the positive side transmission switch 221 and the positive side transmission amplifier 231, and the signal line 229 is a signal line arranged between the negative side transmission switch 222 and the negative side transmission amplifier 232.

In this manner, according to the second modification example of the present technology, the communication device 100 discharges by the short circuit switch 257 that short-circuits the positive side signal line 249 and the negative side signal line 249. Accordingly, it is possible to reduce the number of switches as compared with the case of discharging by two switches.

Note that the above-described embodiment illustrates an example for embodying the present technology, and the matter of the embodiments corresponds to the subject matter of the invention included in the appended claims. Similarly, the subject matter of the invention included in the appended claims corresponds to the matter under the same names as the matter in the embodiments of the present technology. The present technology, however, is not limited to the embodiments, and various modifications can be made to the embodiments without departing from the scope of the technology.

Moreover, the processing procedure in the above-described embodiments may be regarded as a method including these series of procedures, and as a program for causing a computer to execute these series of procedures or as a recording medium for storing the program. This recording medium may be a compact disc (CD), a mini disc (MD), a digital versatile disc (DVD), a memory card, or a Blu-ray (a registered trade name) disc, for example.

Note that effects described herein are non-limiting. The effects may be any effects described in the present disclosure.

Note that the present technology may also be configured as below.

(1) A communication apparatus including:
a transmission unit that transmits a transmission signal;
a reception unit that receives a reception signal;
a switching unit that switches a connection destination of one end of a communication path from one of the transmission unit and the reception unit, to the other; and
a discharge unit that lowers, with discharging, a surge voltage generated in the switching unit due to the switching of the connection destination from the transmission unit to the reception unit.

(2) The communication apparatus according to (1),
in which the reception unit receives and amplifies the reception signal, and
the discharge unit lowers the surge voltage at the time of switching from the transmission unit to the reception unit.

(3) The communication apparatus according to (1) or (2),
in which the discharge unit includes a discharge transistor that is a transistor for lowering the surge voltage by discharging.

(4) The communication apparatus according to (3),
in which the discharge transistor is an N-type transistor.

(5) The communication apparatus according to (3),
in which the discharge transistor is a P-type transistor.

(6) The communication apparatus according to any of (3) to (5),
in which the switching unit includes:

a transmission transistor that is a transistor that opens and closes a path between one end of the communication path and the transmission unit; and a reception transistor that is a transistor that opens and closes a path between the one end of the communication path and the reception unit.

(7) The communication apparatus according to (6), in which a gate width of the discharge transistor is smaller than a gate width of both of the transmission transistor and the reception transistor.

(8) The communication apparatus according to (6) or (7), further including a control circuit for controlling the discharge transistor, the transmission transistor, and the reception transistor to be transitioned to any of a conductive state and a non-conductive state.

(9) The communication apparatus according to (8), in which the control circuit controls the transmission transistor and the reception transistor to be transitioned to the non-conductive states before the reception unit receives the reception signal, controls the discharge transistor to be transitioned to the conductive state, and controls the reception transistor to be transitioned to the conductive state when the reception unit receives the reception signal, and transitions the discharge transistor to the non-conductive state.

(10) The communication apparatus according to any of (1) to (9), in which each of the transmission signal and the reception signal is a differential signal including a positive side signal and a negative side signal, and the discharge unit includes:

a positive side discharge switch that opens or closes a path between a positive side signal line that transmits the positive side signal and a terminal with a predetermined potential; and a negative side discharge switch that opens or closes a path between a negative side signal line that transmits the negative side signal and the terminal with the predetermined potential.

(11) The communication apparatus according to any of (1) to (10), in which each of the transmission signal and the reception signal is a differential signal including a positive side signal and a negative side signal, and the discharge unit includes a short circuit switch that opens and closes a path between a positive side signal line that transmits the positive side signal and a negative side signal line that transmits the negative side signal.

(12) The communication apparatus according to (11), in which ends of the short circuit switch are connected to the positive side signal line and the negative side signal line arranged between the switching unit and the reception unit.

(13) The communication apparatus according to (11), in which ends of the short circuit switch is connected to the positive side signal line and the negative side signal line arranged between the switching unit and one end of the communication path.

(14) The communication apparatus according to (11), in which ends of the short circuit switch is connected to the positive side signal line and the negative side signal line arranged between the switching unit and the transmission unit.

(15) The communication apparatus according to any of (1) to (14), in which the one end of the communication path is a pair of electrodes, and the transmission signal and the reception signal are transmitted via an electric field generated by a voltage between the pair of electrodes.

(16) A method for controlling a communication apparatus, the method including:

a switching procedure, implemented by a switching unit, for switching a connection destination atone end of a communication path from one of a transmission unit that transmits a transmission signal and a reception unit that receives a reception signal, to the other; and a discharging procedure, implemented by a discharge unit, for lowering a surge voltage generated in the switching unit due to the switching of the connection destination, by discharging.

REFERENCE SIGNS LIST

100, 101, 102 Communication device
110 Control circuit
120 Baseband unit
200 Transmission/reception circuit
211, 212 Electrode
220 Transmission side switching unit
221 Positive side transmission switch
222 Negative side transmission switch
230 Transmission amplifier
231 Positive side transmission amplifier
232 Negative side transmission amplifier
240 Reception side switching unit
241 Positive side reception switch
242 Negative side reception switch
250 Discharge unit
251 Positive side discharge switch
252 Negative side discharge switch
253 Positive side N-type transistor
254 Negative side N-type transistor
255 Positive side P-type transistor
256 Negative side P-type transistor
257 Short circuit switch
260 Reception amplifier
270 Input amplifier
280, 281 AD converter

The invention claimed is:

1. A communication apparatus, comprising:
   a transmission circuit configured to transmit a transmission signal;
   a reception circuit configured to receive a reception signal;
   a switching circuit configured to switch a connection destination of one end of a communication path from one of the transmission circuit or the reception circuit to other of the transmission circuit or the reception circuit,
   wherein the switching circuit includes:
      a transmission transistor configured to open and close a path between the one end of the communication path and the transmission circuit; and
      a reception transistor configured to open and close a path between the one end of the communication path and the reception circuit;
   a discharge circuit configured to lower, by discharge, a surge voltage generated in the switching circuit due to the switch of the connection destination,
   wherein the discharge circuit includes a discharge transistor configured to lower the surge voltage by the discharge; and a control circuit configured to control the discharge transistor, the transmission transistor, and the reception transistor to be transitioned to one of a conductive state or a non-conductive state.

2. The communication apparatus according to claim 1, wherein the reception circuit is further configured to receive and amplify the reception signal, and the discharge circuit is further configured to lower the surge voltage at a time of switch from the transmission circuit to the reception circuit.

3. The communication apparatus according to claim 1, wherein the discharge transistor is an N-type transistor.

4. The communication apparatus according to claim 1, wherein the discharge transistor is a P-type transistor.

5. The communication apparatus according to claim 1, wherein a gate width of the discharge transistor is smaller than a gate width of both of the transmission transistor and the reception transistor.

6. The communication apparatus according to claim 1, wherein the control circuit is further configured to:
control the transmission transistor and the reception transistor to be transitioned to the non-conductive state before the reception circuit receives the reception signal;
control the discharge transistor to be transitioned to the conductive state, and
control the reception transistor to be transitioned to the conductive state at a time the reception circuit receives the reception signal; and
transition the discharge transistor to the non-conductive state.

7. The communication apparatus according to claim 1, wherein
each of the transmission signal and the reception signal is a differential signal including a positive side signal and a negative side signal, and
the discharge circuit includes:
a positive side discharge switch configured to one of open or close a path between a positive side signal line that transmits the positive side signal and a terminal with a determined potential; and
a negative side discharge switch configured to one of open or close a path between a negative side signal line that transmits the negative side signal and the terminal with the determined potential.

8. The communication apparatus according to claim 1, wherein
each of the transmission signal and the reception signal is a differential signal including a positive side signal and a negative side signal, and
the discharge circuit includes a short circuit switch configured to open and close a path between a positive side signal line that transmits the positive side signal and a negative side signal line that transmits the negative side signal.

9. The communication apparatus according to claim 8, wherein ends of the short circuit switch are connected to the positive side signal line and the negative side signal line arranged between the switching circuit and the reception circuit.

10. The communication apparatus according to claim 8, wherein ends of the short circuit switch are connected to the positive side signal line and the negative side signal line arranged between the switching circuit and the one end of the communication path.

11. The communication apparatus according to claim 8, wherein ends of the short circuit switch are connected to the positive side signal line and the negative side signal line arranged between the switching circuit and the transmission circuit.

12. The communication apparatus according to claim 1, wherein the one end of the communication path comprises a pair of electrodes, and wherein the transmission signal and the reception signal are transmitted via an electric field generated by a voltage between the pair of electrodes.

13. A method, comprising:
in a communication apparatus:
switching, by a switching circuit, a connection destination at one end of a communication path from one of a transmission circuit that transmits a transmission signal or a reception circuit that receives a reception signal to other of the transmission circuit or the reception circuit,
wherein the switching circuit includes:
a transmission transistor configured to open and close a path between the one end of the communication path and the transmission circuit; and
a reception transistor configured to open and close a path between the one end of the communication path and the reception circuit;
lowering, by a discharge circuit, a surge voltage generated in the switching circuit due to the switching of the connection destination, by discharging,
wherein the discharge circuit includes a discharge transistor configured to lower the surge voltage by the discharge; and
controlling, by a control circuit, the discharge transistor, the transmission transistor, and the reception transistor to be transitioned to one of a conductive state or a non-conductive state.

14. A communication apparatus, comprising:
a transmission circuit configured to transmit a transmission signal;
a reception circuit configured to receive a reception signal;
a switching circuit configured to switch a connection destination of one end of a communication path from one of the transmission circuit or the reception circuit to other of the transmission circuit or the reception circuit; and
a discharge circuit configured to lower, by discharge, a surge voltage generated in the switching circuit due to the switch of the connection destination,
wherein each of the transmission signal and the reception signal is a differential signal including a positive side signal and a negative side signal, and
the discharge circuit includes:
a positive side discharge switch configured to one of open or close a path between a positive side signal line that transmits the positive side signal and a terminal with a determined potential; and
a negative side discharge switch configured to one of open or close a path between a negative side signal line that transmits the negative side signal and the terminal with the determined potential.

15. A communication apparatus, comprising:
a transmission circuit configured to transmit a transmission signal;
a reception circuit configured to receive a reception signal;
a switching circuit configured to switch a connection destination of one end of a communication path from one of the transmission circuit or the reception circuit to other of the transmission circuit or the reception circuit; and a discharge circuit configured to lower, by discharge, a surge voltage generated in the switching circuit due to the switch of the connection destination, wherein each of the transmission signal and the reception signal is a differential signal including a positive side signal and a negative side signal, and the discharge circuit includes a short circuit switch configured to open and close a path between a positive side signal line that transmits the positive side signal and a negative side signal line that transmits the negative side signal.

* * * * *